(12) United States Patent
Choi et al.

(10) Patent No.: US 11,932,788 B2
(45) Date of Patent: Mar. 19, 2024

(54) ELECTRICALLY CONDUCTIVE ADHESIVE FILM AND PRODUCING METHOD THEREOF

(71) Applicant: 3M INNOVATIVE PROPERTIES COMPANY, St. Paul, MN (US)

(72) Inventors: Jeongwan Choi, Kyonggi-Do (KR); Taehoon Noh, Gyeonggi-do (KR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 99 days.

(21) Appl. No.: 17/645,805

(22) Filed: Dec. 23, 2021

(65) Prior Publication Data

US 2022/0112408 A1 Apr. 14, 2022

Related U.S. Application Data

(62) Division of application No. 17/250,483, filed as application No. PCT/IB2019/056794 on Aug. 9, 2019, now Pat. No. 11,242,473.

(30) Foreign Application Priority Data

Aug. 9, 2018 (KR) .................. 10-2018-0093366

(51) Int. Cl.
  *C09J 9/02* (2006.01)
  *C09J 7/10* (2018.01)
  (Continued)

(52) U.S. Cl.
  CPC . *C09J 9/02* (2013.01); *C09J 7/10* (2018.01); *C09J 11/04* (2013.01); *H01B 1/22* (2013.01); *H01B 5/14* (2013.01); *C09J 2301/314* (2020.08); *C09J 2301/408* (2020.08); *C09J 2400/16* (2013.01)

(58) Field of Classification Search
  CPC .......................................................... C09J 9/02
  See application file for complete search history.

(56) References Cited

U.S. PATENT DOCUMENTS

| 4,923,739 A | 5/1990 | Jin et al. | |
|---|---|---|---|
| 5,604,026 A * | 2/1997 | King | H01L 24/29 |
| | | | 428/317.1 |

(Continued)

FOREIGN PATENT DOCUMENTS

| EP | 03026311 A1 | 2/1987 |
|---|---|---|
| JP | 2005-116291 | 4/2005 |
| JP | 2007-026776 | 2/2007 |

OTHER PUBLICATIONS

PCT International Search Report from PCT/IB2019/056794, dated Dec. 24, 2019, 5 pages.

*Primary Examiner* — William D Young
(74) *Attorney, Agent, or Firm* — Robert S. Moshrefzadeh

(57) ABSTRACT

A conductive adhesive film according to an embodiment includes: an adhesive base layer including first and second major surfaces facing each other; and a plurality of discrete individual particles distributed in the adhesive base layer, wherein outer surfaces of the particles are coated with metal at least in part to form metal coatings, and the metal coatings are connected with one another and are extended between the first and second major surfaces, such that an electrically and mechanically continuous three-dimensional porous network of the metal is formed.

2 Claims, 6 Drawing Sheets

(51) Int. Cl.
    *C09J 11/04*     (2006.01)
    *H01B 1/22*      (2006.01)
    *H01B 5/14*      (2006.01)

(56) References Cited

U.S. PATENT DOCUMENTS

| | | |
|---|---|---|
| 5,814,180 A | 9/1998 | King |
| 5,958,590 A | 9/1999 | Kang et al. |
| 2005/0106382 A1 | 5/2005 | Kashihara et al. |
| 2009/0035553 A1 | 2/2009 | Yeh et al. |
| 2013/0118773 A1 | 5/2013 | Liu et al. |
| 2019/0185721 A1* | 6/2019 | Seo ............................ C09J 7/21 |

* cited by examiner

ELECTRICALLY CONDUCTIVE ADHESIVE FILM AND PRODUCING METHOD THEREOF

CROSS REFERENCE TO RELATED APPLICATIONS

The present application is a divisional application of U.S. application Ser. No. 17/250,483, filed Jan. 27, 2021, now allowed, which is a national stage filing under 35 U.S.C. 371 of PCT/IB2019/056794, filed Aug. 9, 2019, which claims priority to KR Application No. 10-2018-0093366, filed Aug. 9, 2018, the disclosures of which are incorporated by reference in its/their entirety herein.

BACKGROUND

Technical Field

The present disclosure relates to a conductive adhesive film and a producing method thereof.

Background Art

A conductive adhesive film generally includes a plurality of conductive particles in an adhesive layer thereof, and the plurality of conductive particles contact one another, thereby forming a conductive path. As the conductive path is formed, the conductive film has electrical conductivity.

A contact resistance may be formed on a contact portion between the plurality of conductive particles, and thus may influence electrical conductivity of the conductive film.

SUMMARY

Technical Problem

The present disclosure provides a conductive adhesive film having high conductivity and a producing method thereof.

Technical Solution

According to an aspect of the present disclosure, a conductive adhesive film includes: an adhesive base layer including first and second major surfaces facing each other; and a plurality of discrete individual particles distributed in the adhesive base layer, wherein outer surfaces of the particles are coated with metal at least in part to form metal coatings, and the metal coatings are connected with one another and are extended between the first and second major surfaces, such that an electrically and mechanically continuous three-dimensional porous network of the metal is formed.

According to an aspect of the present disclosure, a conductive adhesive film includes: an adhesive base layer including first and second major surfaces facing each other; a continuous unitary three-dimensional network of hollow tubular metal structures which are electrically and mechanically connected with one another, the hollow tubular metal structures being embedded in the adhesive base layer and being extended between the first and second major surfaces; and at least one discrete individual particle disposed in each of the hollow tubular metal structures.

According to an aspect of the present disclosure, a conductive adhesive film includes: an adhesive base layer including first and second major surfaces facing each other; and a plurality of chains of discrete individual particles distributed in the adhesive base layer, wherein, with respect to each chain of the discrete individual particles: the chain is extended between the first and second major surfaces; a binder couples adjacent particles in the chain; and the binder and the particles in the chain are coated with metal along the chain between the first and second major surfaces to form a continuous metal path.

According to an aspect of the present disclosure, a conductive adhesive film includes: an adhesive base layer including first and second major surfaces facing each other; and a network of conductive links which are connected with one another at a plurality of nodes disposed in the adhesive base layer, and are elongated to extend between the first and second major surfaces, wherein each link includes an elongated center particle surrounded by a metal layer, and, with respect to each pair of the links connected to one of the nodes, the metal layer of one of the links is extended to the metal layer of another of the links seamlessly, and, with respect to each link, the center particle of the link occupies at least 80 volume percent of the link.

According to an aspect of the present disclosure, a method for producing a conductive adhesive film includes: providing a plurality of particles, adjacent particles being in contact with each other in a contact region; coupling adjacent particles to each other in a corresponding contact region by using a binder; and coating the particles and the binders with metal to form an electrically and mechanically continuous three-dimensional porous network of metal.

Advantageous Effects

According to an embodiment of the present disclosure, a conductive adhesive film having high conductivity can be provided.

DETAILED DESCRIPTION

Figure 1:
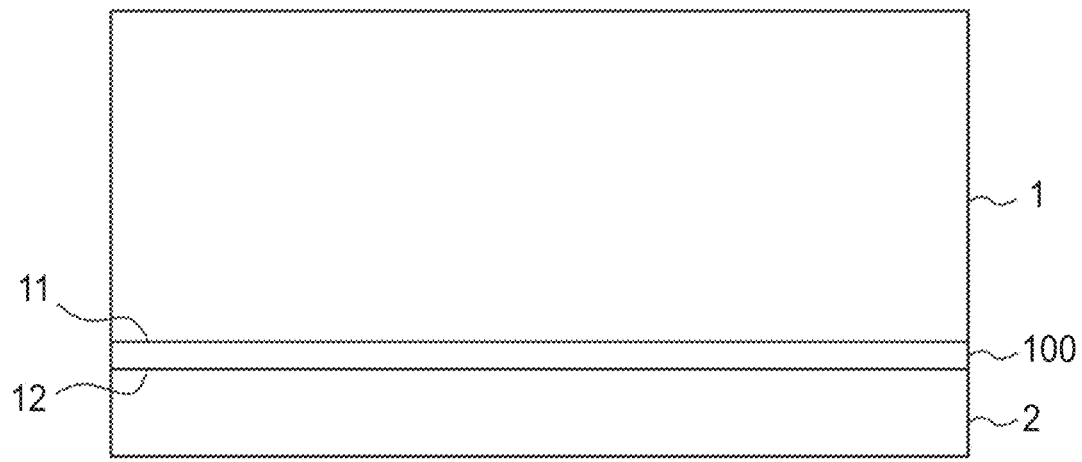
FIG. 1 is a view illustrating an embodiment of a conductive adhesive film of the present disclosure used.

Hereinafter, specific embodiments for implementing the concept of the present disclosure will be described in detail with reference to the drawings. Herein, it should be noted that the drawings are not drawn at a constant ratio for convenience of explanation. Further, in explaining the present disclosure, any specific explanation on a well-known related configuration or function deemed to obscure the gist of the present disclosure will be omitted. It is noted that terms or words used in the detailed description and the claims described hereinbelow should not be interpreted as having ordinary or dictionary meanings, and should be interpreted as meanings and concepts conforming to the technical concept of the present disclosure, based on the principle that the inventors can appropriately define the concepts of terms to explain their own invention in the best method. Accordingly, the embodiments described in the detailed description and the configurations illustrated in the drawings are merely the most preferred embodiments, and do not represent all technical concepts of the present disclosure. Therefore, it should be understood that there may be various equivalents and variations substituting these at the time of filing of the present application.

Exemplary embodiments and terms used herein are not intended to limit the technical features described in the present disclosure to specific embodiments, and should be construed as including various modification, equivalent and/or alternative of corresponding embodiments. In the explanation of the drawings, similar reference numerals are used for similar elements. Unless otherwise specified, a singular expression includes a plural expression. The terms "A or B," "at least one of A and/or B," "A, B, or C," or "at least one of A, B, and/or C" used in the present disclosure include any and all combinations of the associated listed items. The terms such as "first," "second," and the like may be used to refer to corresponding elements regardless of the order or importance of the elements, and may be used to distinguish one element from another element, but do not limit the elements. It will be understood that when an element (e.g., a first element) is referred to as being "connected to," "contacted with," or "bonded to" another element (e.g., a second element), it can be directly connected to another element or can be connected to another element via still another element (e.g., a third element).

A conductive adhesive film described in the detailed description of the present disclosure may be used to bond various objects, such as electronic components, products using electronic circuits, or the like, to each other, and to allow electricity to flow between the objects.

FIG. 1 is a view illustrating an embodiment of a conductive adhesive film of the present disclosure used;

Referring to FIG. 1, the conductive adhesive film 100 may be disposed between a first bonding object material 1 and a second bonding object material 2 to bond to each other. The conductive adhesive film 100 is disposed between the first bonding object material 1 and the second bonding object material 2 to bond to each other to tightly bond the first bonding object material 1 and the second bonding object material 2 to each other.

The conductive adhesive film 100 may include a first major surface 11 and a second major surface 12 facing each other. The first major surface 11 may adhere to the first bonding object material 1, and the second major surface 11 may adhere to the second bonding object material 2. Accordingly, the first bonding object material 1 and the second bonding object material 2 may be bonded and connected to each other with the conductive adhesive film 100 being disposed therebetween.

FIG. 1 depicts that the first bonding object material 1 adheres to the first major surface 11 of the conductive adhesive film 100 of the present embodiment, and the second bonding object material 2 adheres to the second major surface 12 for convenience of explanation, but it is noted that the conductive adhesive film 100 may be disposed among a plurality of bonding object materials.

Figure 2:
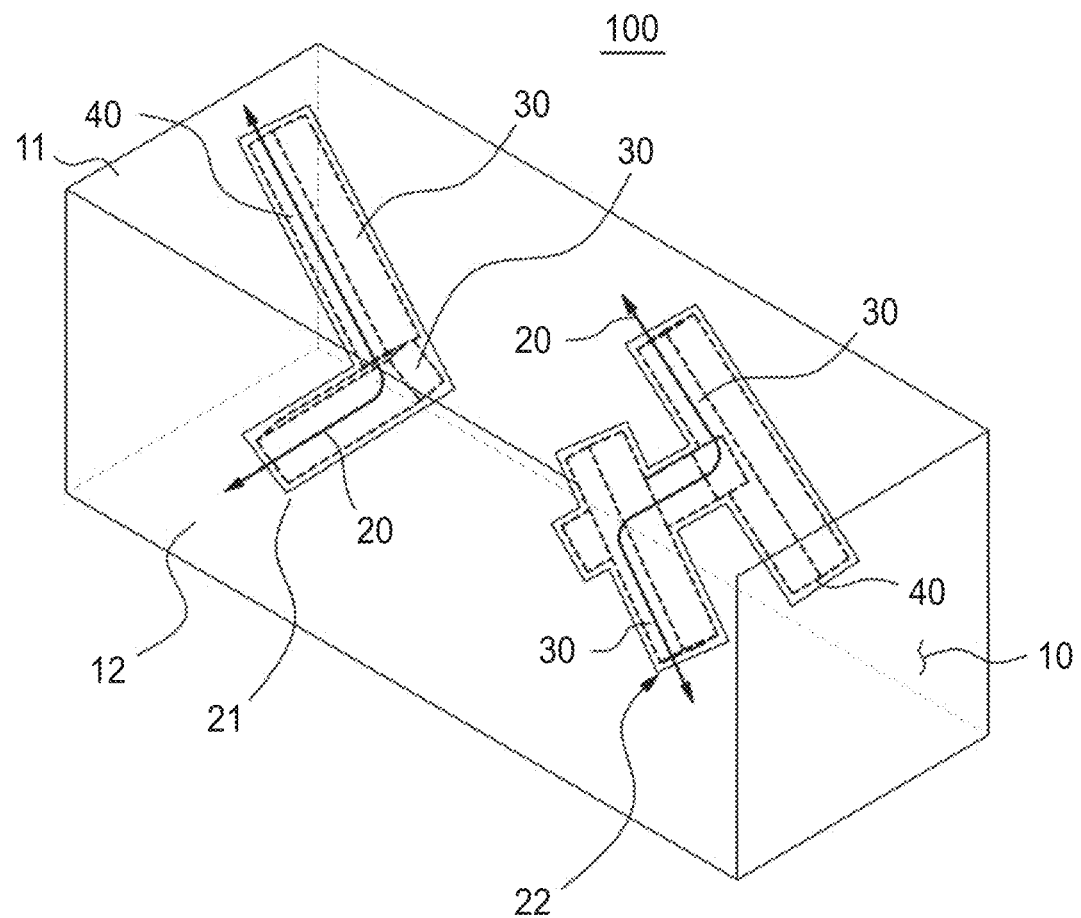
FIG. 2 is a perspective view of the conductive adhesive film according to an embodiment of the present disclosure.

FIG. 2 is a perspective view showing the conductive adhesive film according to an embodiment.

Figure 3:
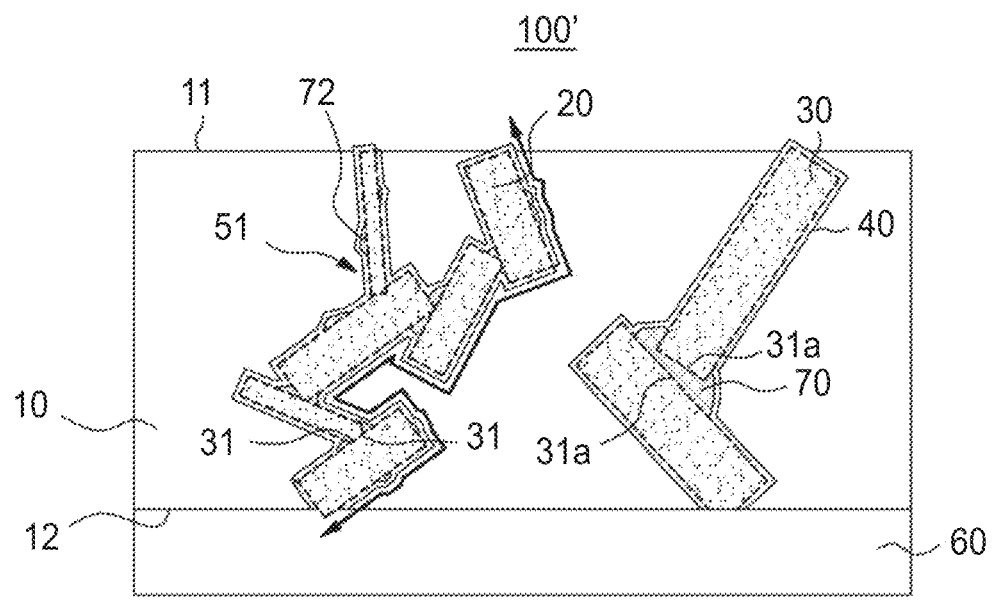
FIG. 3 is a view illustrating an example of a cross section of a conductive adhesive film according to an embodiment of the present disclosure.

Referring to FIG. 2, the conductive adhesive film 100 may include an adhesive base layer 10, and a plurality of discrete individual particles (hereinafter, a plurality of particles) 30. Alternatively, the conductive adhesive film 100 may further include a substrate 60 as shown in FIG. 3.

The adhesive base layer 10 may be laminated or disposed on an upper portion of a base material 60. The adhesive base layer 10 may include a first surface 11 and a second surface 12 which face each other. The adhesive base layer 10 may be filled with an adhesive and may have adhesion. The adhesive base layer 10 may include, for example, one or more of a pressure sensitive adhesive (PSA), a hot melt adhesive, a thermoset adhesive, a solvent based adhesive, and a water based adhesive.

The plurality of particles 30 are distributed and disposed in the adhesive base layer 10. The plurality of particles 30 are connected with one another in the adhesive base layer 10. The plurality of particles 30 may be connected with one another, thereby forming a chain. After the chain is formed, outer surfaces of the plurality of particles 30 may be coated with metal at least in part, thereby forming metal coatings.

The plurality of particles 30 forming the chain may be positioned across the adhesive base layer 10 in the vertical direction. In other words, the plurality of particles are connected with one another, thereby forming the chain as shown in FIG. 2, and may be disposed across the first major surface 11 and the second major surface 12 of the adhesive base layer 10. In the detailed description, the plurality of particles 30 connected with one another as described above may be referred to as a chain. However, it is noted that the technical concept of the present disclosure is not limited to this term.

As the chain is formed, a conductive path 20 may be formed between the first major surface 11 and the second major surface 12. That is, the conductive path 20 may be formed along a path of the chain connecting the first major surface 11 and the second major surface 12 of the adhesive base layer 10. Herein, the conductive path 20 may refer to a path through which an electric charge moves, that is, a path through which electricity conducts.

The plurality of particles 30 may be connected with one another, thereby forming a three-dimensional porous network. The three-dimensional porous network may include a plurality of chains. The plurality of chains may form the three-dimensional porous network, respectively, and individually may include a first chain 21 and a second chain 22 connecting the first major surface 11 and the second major surface 12 of the adhesive base layer 10.

The three-dimensional porous network may define a network of links which are connected with one another at a plurality of nodes, and are coated with conductive metal. With respect to at least one of the nodes connecting at least two of the metal-coated links, the metal coating may be extended from one of the metal-coated links to another of the metal-coated links seamlessly.

The plurality of particles 30 may be formed with various materials. For example, the plurality of particles 30 may be formed with a conductive material or a non-conductive material (or an insulation material).

The conductive material may include, for example, one of carbon, metal fiber, metal-coated glass, and a polymer fiber, or a combination thereof. Such a material is an example of the conductive material, and the conductive material may include general materials having conductivity.

The non-conductive material may include, for example, one of a polyester fiber, a polymer fiber such as an olefin fiber, etc., and a ceramic fiber such as a glass fiber, etc., or a combination thereof. In some cases, the plurality of particles 30 may be formed with a combination of a conductive material and an insulation material. Such a material is an example of the insulation material, and the insulation material may include general materials having an insulating property.

The plurality of particles 30 forming the chain may be coated with metal. Accordingly, coating surfaces 40 may be formed on the outer surfaces of the plurality of particles 30. The metal forming the coating surfaces 40 may include, for example, one or more of gold, copper, nickel, silver, aluminum, etc. or an alloy thereof.

The majority of the plurality of particles 30 may have an elongated shape. Regarding the shapes of the plurality of particles 30, FIG. 2 illustrates the plurality of particles 30 as having a rectangular column shape, but this should not be considered as limiting, and it is noted that the plurality of particles 30 may have various shapes, such as a cylindrical shape, a spherical shape, a filamentary shape, a plate shape, a dendritic shape, etc.

An electric charge may move between the first major surface 11 and the second major surface 12 of the adhesive base layer 10 along the coating surfaces 40, and accordingly, the conductive adhesive film 100 has conductivity which is an electrically conducting property. The path along which the electric charge moves may be referred to as the conductive path 20. When the plurality of particles 30 are conductive, the electric charge may move not only through the coating surfaces 40 but also through the plurality of particles 30 like the conductive path 20 shown in FIG. 2.

The base material 60 may refer to a configuration serving as a structural frame for arranging the plurality of particles 30 and forming the adhesive base layer 10 in the manufacturing process of the conductive adhesive film 100. The base material 60 may be formed with various materials, and in some cases, the base material 60 may be removed after the adhesive base layer 10 is formed. Accordingly, bonding object materials adhere to the first major surface 11 and the second major surface 12 of the conductive adhesive film 100, and the conductive adhesive film 100 may function as a double-sided tape.

The base material 60 may be formed with, for example, a releasing-treated polymer film material.

In addition, referring to the second unitary network 22 portion of FIG. 2, the plurality of particles 30 may be disposed to cross over one another, and accordingly, spaces among the plurality of particles 30 or space in the vicinity of the plurality of particles 30 may be filled with an adhesive.

FIG. 3 is a view illustrating an example of a cross section of a conductive adhesive film according to an embodiment. FIG. 3 is a cross-sectional view of the conductive adhesive film 100. The same reference numerals are used for the same elements as those of the conductive adhesive film 100 shown in FIGS. 1 and 2.

Referring to FIG. 3, the conductive adhesive film 100' may include a base material 60, a plurality of particles 30, and an adhesive base layer 10.

The base material 60 and the adhesive base layer 10 may be laminated or disposed in sequence. Specifically, the base material 60 may be disposed and the adhesive base layer 10 may be disposed on an upper side of the base material 60.

The adhesive base material 10 may include the plurality of particles 30 coated with metal. The plurality of particles 30 may be disposed in the adhesive base layer 10 to penetrate through the adhesive base layer 10 in the vertical direction. Specifically, the plurality of particles 30 may be disposed across a first major surface 11 and a second major surface 12 of the adhesive base layer 10 while being connected with one another in contact with one another.

The plurality of particles 30 may be connected with one another in contact with one another at least in part, thereby forming a chain. In an embodiment, at least some of the plurality of particles 30 may be in direct contact with each other on contact surfaces 31, thereby forming a conductive path 20. In another embodiment, at least some of the plurality of particles 30 may be in proximity contact with each other on proximity contact surfaces 31a, that is, in contact with each other, spaced apart from each other by a predetermined distance, thereby forming the conductive path 20. In this case, the proximity contact surfaces 31a between the plurality of particles 30 may be coupled to each other via a binder 70.

As described above, the binder 70 may be disposed between the plurality of particles 30. In some cases, the binder 70 may be disposed on at least part of the outer surfaces of the plurality of particles 30.

Figure 4:
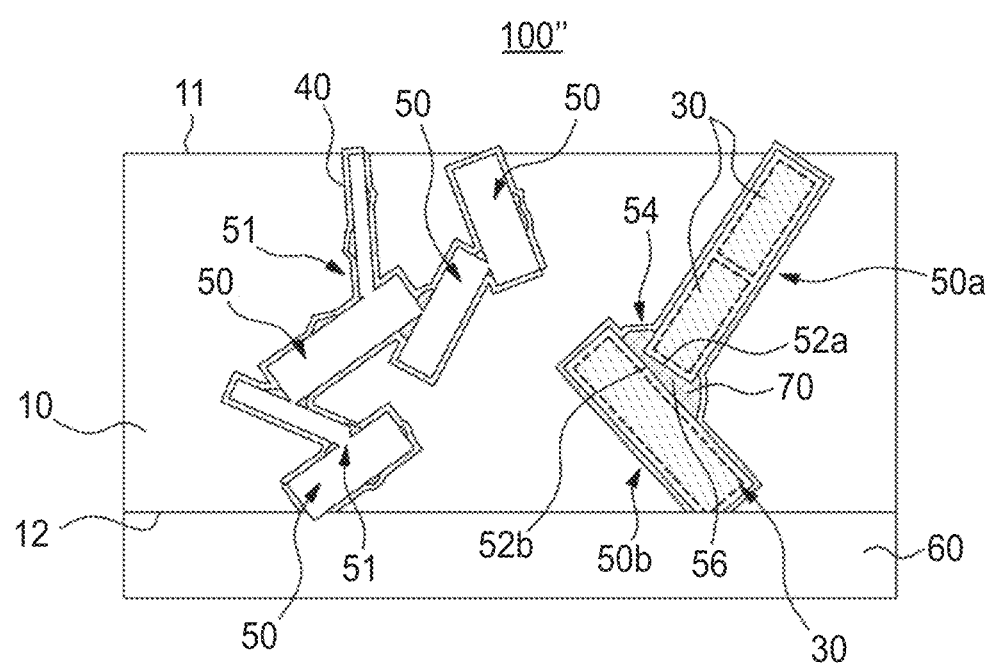
FIG. 4 is a view illustrating another example of a cross section of a conductive adhesive film according to an embodiment of the present disclosure.

FIG. 4 is a view illustrating another example of a cross section of a conductive adhesive film according to an embodiment.

Referring to FIG. 4, the conductive adhesive film 100" may include a base material 60, a plurality of hollow tubular structures 50, and an adhesive base layer 10.

The base material 60 and the adhesive base layer 10 may be laminated or disposed in sequence. For example, the base material 60 may be disposed and the adhesive base layer 10 may be disposed on an upper side of the base material 60.

The hollow tubular structures 50 may be included in the adhesive base layer 10. In other words, the hollow tubular structures 50 may be embedded in the adhesive base layer 10. The hollow tubular structure 50 may be a structure of a column shape which is elongated and has a hollow formed therein. Due to this shape, the hollow tubular structure 50 may have an opening portion formed on an end region 56 thereof.

FIG. 4 illustrates the hollow tubular structure 50 as having a rectangular shape, but this should not be considered as limiting, and it is noted that the hollow tubular structure 50 may have various shapes, such as a circular shape, a cylindrical shape, a diamond shape, a spherical shape, a filamentary shape, a plate shape, a dendritic shape, etc.

The hollow tubular structure 50 may be formed with a conductive material. A specific example of the conductive material is the same as the conductive material forming the plurality of particles 30 described above in FIG. 2, and an explanation thereof is omitted.

The plurality of hollow tubular structures 50 may be provided, and at least some of the hollow tubular structures 50 may be extended in contact with one another, thereby forming a chain. Accordingly, a conductive path 20 may be formed in the longitudinal direction of the chain. In this case, the plurality of hollow tubular structures 50 may be in direct contact with one another, or may be in proximity contact with one another, spaced apart from one another by a predetermined distance.

When the plurality of hollow tubular structures 50 are in direct contact with one another, directly contacting surfaces may be referred to as contact surfaces 31. The contact surface may be at least part of each of the plurality of hollows tubular structures 50. In addition, a portion where the contact surface 31 of each of the plurality of hollow tubular structures 50 is positioned may be referred to as a node 51. The plurality of hollow tubular structures 50 may include a plurality of nodes 51.

When the plurality of hollow tubular structures 50 are in proximity contact with one another, spaced apart from one another by a predetermined distance, a binder 70 may be disposed therebetween to couple the plurality of hollow tubular structures 50 to each other. As shown in FIG. 4, the binder 70 may be disposed on at least part of the outer surfaces of the plurality of hollow tubular structures 50.

The plurality of hollow tubular structures 50 may be coupled to one another in various forms. For example, referring to FIG. 4, a first hollow tubular structure 50*a* may be coupled to a second hollow tubular structure 50*b* with a predetermined distance being therebetween by using the binder 70. Specifically, one end 52*a* of the first hollow tubular structure 50*a* may be coupled to a center portion 52*b* of the second hollow tubular structure 50*b* in contact therewith. FIG. 6 depicts that the hollow tubular structures 50 are in proximity contact with each other, spaced apart from one another by a predetermined distance, but this should not be considered as limiting, and it is noted that the hollow tubular structures 50 may be coupled to each other in direct contact with each other.

In some cases, a portion where one end 52*a* of the first hollow tubular structure 50*a* is positioned may be referred to as the end region 56. The end region 56 is a distal end of the first hollow tubular structure 50*a*, and may be a portion where the first hollow tubular structure 50*a* is coupled to the second hollow tubular structure and also may be a region that is filled with the binder 70.

Regarding at least two hollow tubular metal structures 50*a*, 50*b*, one end 52*a* of the first hollow tubular structure 50*a* out of the hollow tubular metal structures 50*a*, 50*b* may be in contact or in proximity contact with the center portion 52*b* of the second hollow tubular structure 50*b* out of the hollow tubular metal structures 50*a*, 50*b* in the end region 56. The hollow tubular metal structures 50*a*, 50*b* may define a hollow opening portion between the two hollow tubular metal structures 50*a*, 50*b* in the end region 56, and the hollow opening portion may be filled with a different binder from the adhesive base layer at least in part.

The plurality of hollow tubular structures 50 which are in contact with one another or in proximity contact with one another may be disposed in the adhesive base layer 10 to penetrate through the adhesive base layer 10 in the vertical direction. Specifically, the plurality of particles 30 may be disposed across the first major surface 11 and the second major surface 12 of the adhesive base layer 10, which face each other, while being connected with one another in contact with one another.

In an embodiment, at least one of the plurality of particles 30 may be disposed in the hollow tubular structure 50. For example, one of the plurality of particles 30 may be disposed in the hollow tubular structures 50*a*, 50*b*, or at least two of the plurality of particles 30 may be disposed. The plurality of particles 30 disposed in the hollow tubular structures 50*a*, 50*b* may substantially fill the hollow tubular structures 50.

FIG. 4 depicts that particles are included in some of the hollow tubular structures 50, but this should not be considered as limiting, and particles may be included in all of the hollow tubular structures 50 or particles may be included in some of the hollow tubular structures 50.

As described above, the plurality of hollow tubular structures 50 are physically in contact with one another, thereby forming the chain and forming the conductive path 20, such that a three-dimensional porous network can be formed by the hollow tubular structures 50. The three-dimensional porous network may have an electrically and mechanically continuing property.

Although FIGS. 3 and 4 illustrate the conductive adhesive films 100 of different embodiments, some of the elements of FIGS. 3 and 4 may be combined to form one conductive adhesive film 100. For example, the conductive adhesive film 100 may include both the chain formed of the coating surfaces 40 and the plurality of particles 30 of FIG. 3, and the chain formed of the hollow tubular structures 50 and the plurality of particles 30 of FIG. 4.

Figure 5:
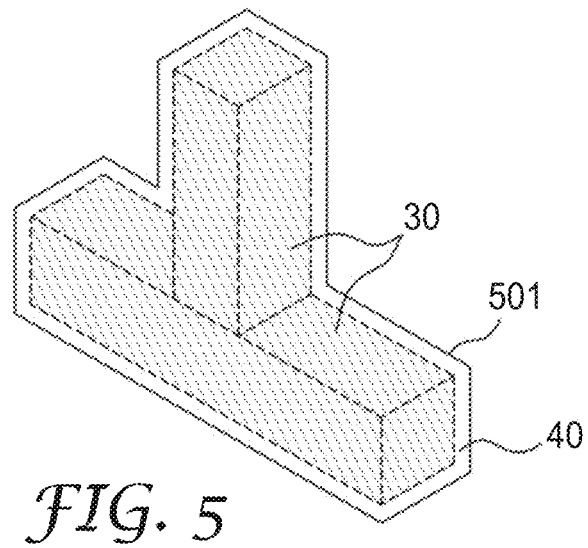
FIG. 5 is a concept view illustrating a link formed of a plurality of conductive particles according to an embodiment of the present disclosure.

FIG. 5 is a concept view illustrating a link formed of a plurality of conductive particles according to an embodiment.

The link 501 may include a plurality of particles 30 and coating surfaces 40 surrounding the plurality of particles 30. With reference to a volume of the link 501 (hereinafter, a link volume), a volume of the plurality of particles 30 may occupy at least 80 volume percent of the volume of the link 501. The 80 volume percent of the volume of the link 501 may refer to 80% of the link volume.

FIGS. 6A to 6D are views illustrating an example of a method for producing a conductive adhesive film according to an embodiment.

Figure 6A:
FIGS. 6A to 6D are views illustrating an example of a method for producing a conductive adhesive film according to an embodiment of the present disclosure.

Referring to FIG. 6A, an initial fiber 30*a* before a plurality of particles 30 are formed may be one elongated fiber. The initial fiber 30*a* may be a conductive material or an insulation material. The initial fiber 30*a* may be split. The initial fiber 30*a* may be split at predetermined intervals or at certain intervals.

Figure 6B:
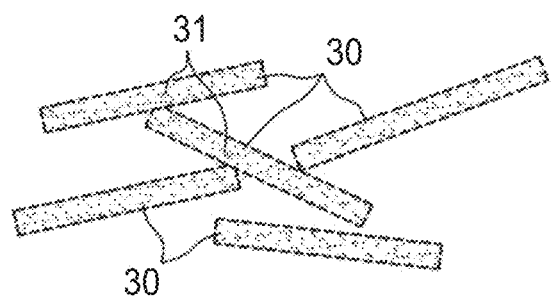

Referring to FIG. 6B, the plurality of particles 30 may be formed by splitting the initial fiber 30*a*. The plurality of particles 30 may be split into discrete individual particles, thereby being distributed. In the process of being distributed, the plurality of particles 30 may come into contact with one another at least in part. Portions of the plurality of particles 30 coming into contact with each other may be contact surfaces 31, and the plurality of particles 30 may be connected with one another through the contact surfaces, thereby forming a chain.

Figure 6C:
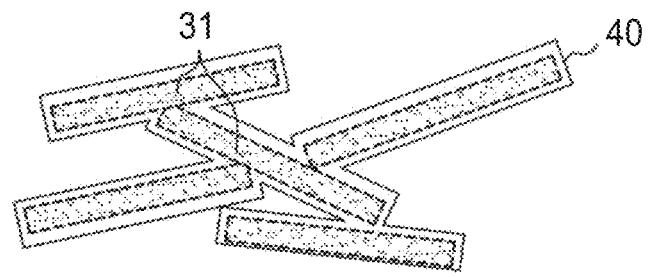

Referring to FIG. 6C, outer surfaces of the plurality of particles 30 forming the chain may be coated with metal, and accordingly, coating surfaces 40 may be formed. The coating surfaces 40 may coat the outer surfaces of the plurality of particles 30 seamlessly. For example, the coating surfaces 40 formed on the outer surfaces of the plurality of particles 30 may be formed to coat the plurality of particles 30 uniformly and smoothly.

Alternatively, when individual particles coated with metal come into contact with one another and form a conductive path formed with the plurality of particles, there are seams on the contact portions of the individual particles, and accordingly, there is a contact resistance. However, the shape of the coating surfaces 40 is not limited to the above-described example, and it is noted that the coating surfaces 40 may have various shapes without a seam. For example, the coating surfaces 40 may have a thicker specific portion than the other portions or may have a ununiform shape.

The coating surface 40 may not be formed on portions where the plurality of particles 30 are in contact with one another, that is, on the contact surfaces 31. For example, when the plurality of particles 30 are in contact with one another across one another, the coating surface 40 may not be formed on the contact surface between the plurality of particles 30. In other words, when the plurality of particles 30 are in contact with one another while intersecting with one another, the coating surface 40 may not be formed on the contact surface 31 between the plurality of particles 30.

When the plurality of particles 30 are in proximity contact with one another, the coating surface 40 may not be formed on a contact surface between the plurality of particles 30. The contact surface between the plurality of particles 30 which are in proximity contact with each other, spaced apart from each other by a predetermined distance, may be referred to as a proximity contact surface.

Figure 6D:
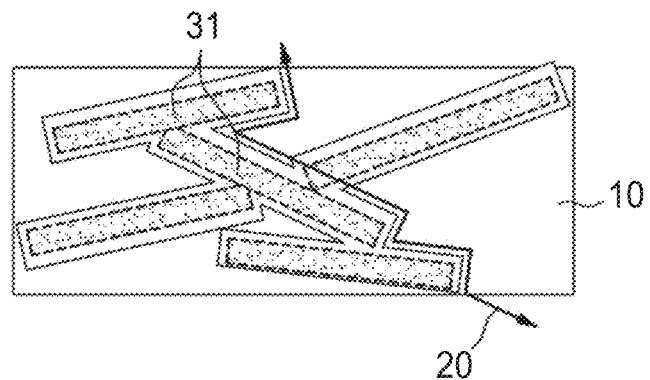

Referring to FIG. 6D, the plurality of particles 30 on which the coating surfaces 40 are formed may be immersed in the adhesive base layer 10. An upper end of the adhesive base layer may be the first major surface 11, and a lower end of the adhesive base layer may be the second major surface 12. The plurality of particles 30 may be disposed across the first major surface 11 and the second major surface 12 of the adhesive base layer 10. Accordingly, the conductive path 20 through which an electric charge is moved may be formed between the first major surface 11 and the second major surface 12 of the adhesive base layer 10 along the coating surfaces 40 of the plurality of particles 30 in the adhesive base layer 10.

When the plurality of particles 30 are conductive material, the conductive path 20 may be extended not only to the coating surfaces 40 but also to the plurality of particles 30. For example, not only the coating surfaces 40 but also the plurality of particles 30 may serve as a moving passage of the electric charge. In other words, the plurality of particles 30 which are the conductive material and the coating surfaces 40 may entirely act as the conductive path 20.

As described above, the plurality of particles 30 are physically in contact with one another, thereby forming the chain, and the coating surfaces 40 of the plurality of particles 30 are generated to form the conductive path 20, such that the three-dimensional porous network formed of the plurality of particles 30 can have an electrically and mechanically continuing property.

The adhesive base layer 10 may be formed on the base material 60 of FIG. 2. Herein, the base material 60 may indicate a releasing film. In this case, the conductive adhesive film 100 of FIG. 2 may be formed by coating the releasing film with the adhesive base layer 10.

Figure 7A:
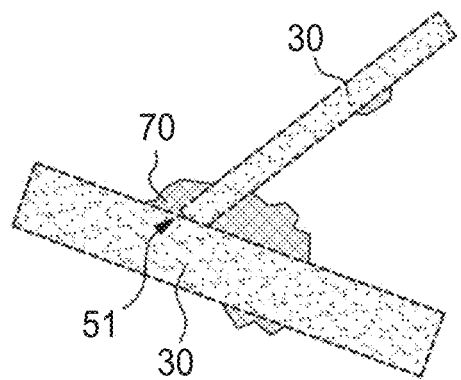
FIGS. 7A to 7C are views illustrating another example of a method for producing a conductive adhesive film according to an embodiment of the present disclosure.
Figure 7B:
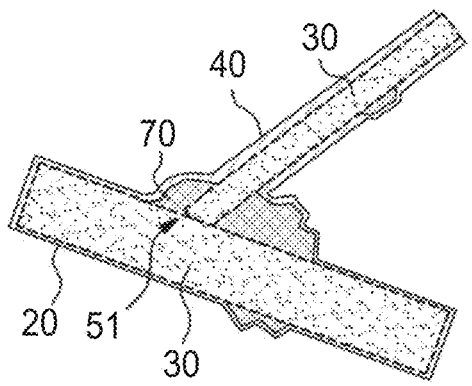
Figure 7C:
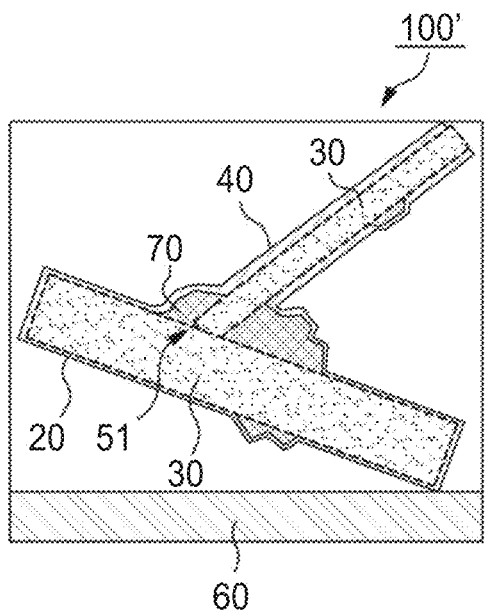

FIGS. 7A to 7C are views illustrating another example of a method for producing a conductive adhesive film according to an embodiment. The same reference numerals are used for the same elements as those of the conductive adhesive film 100 shown in FIG. 2.

Referring to FIG. 7A, portions of a plurality of particles 30 may be in contact with each other through a contact surface 51 where the plurality of particles are in contact with each other. Accordingly, a three-dimensional porous network formed of the plurality of particles 30 may be formed. Herein, the plurality of particles 30 may be formed by splitting an initial fiber 30a.

A binder 70 may be disposed on the contact surface 51 of the plurality of particles 30. The binder 70 may couple the plurality of particles 30 to each other on the contact surface 51. The binder 70 may be disposed between the plurality of particles 30 to bring the plurality of particles 30 into close contact with each other.

Specifically, the binder 70 may be disposed between the contact surfaces of the plurality of particles 30 to extend the contact between the plurality of particles 30 and to couple the plurality of particles 30 to each other. In some cases, the binder 70 may also be disposed on the periphery of the contact surfaces of the plurality of particles 30 as shown in FIG. 4. That is, the binder 70 may be disposed to cover at least part of the outer surfaces of the plurality of particles 30.

The plurality of particles 30 may be connected with each other by the binder 70, thereby forming a chain, and accordingly, the three-dimensional porous network formed with the plurality of particles 30 and the binder 70 may be formed.

Referring to FIG. 7B, the outer surfaces of the plurality of particles 30 and the binder 70 may be coated with metal, thereby forming coating surfaces 40. The coating surfaces 40 may coat the outer surfaces of the plurality of particles 30 and the binder 70 seamlessly.

The coating surfaces 40 may be formed on the outer surfaces of the plurality of particles 30 and the binder 70, such that a conductive path 20 is formed along the coating surfaces 40. As described above with reference to FIG. 3, the conductive path may be extended according to a material forming the plurality of particles 30. This has been described above in detail with reference to FIG. 3, and a detailed description is omitted.

Referring FIG. 7C, the plurality of particles 30 and the binder 70 on which the coating surfaces 40 are formed may be immersed in an adhesive base layer 10. The plurality of particles 30 may be disposed across the upper portion and the lower portion of the adhesive base layer 10. Accordingly, the conductive path 20 from the upper portion of the adhesive base layer 10 to the lower portion or from the lower portion to the upper portion may be formed along the coating surfaces 40 of the plurality of particles 30 in the adhesive base layer 10.

The conductive adhesive film 100, 100', 100" according to embodiments can provide an electrically continuous conductive path. That is, the conductive adhesive film 100, 100', 100" can provide a continuous conductive path without a specific connecting point. Accordingly, electrical conduction can constantly and uniformly occur along the conductive path.

That is, the conductive path is formed along the coating surfaces 40 in the conductive adhesive film 100, 100' 100," such that a resistance which may be occurred by a contact surface when conduction occurs only through the plurality of particles 30 or the hollow tubular structures 50 can be minimized and thus higher conductivity can be obtained.

Although the conductive adhesive film according to the embodiments of the present disclosure has been described by referring to specific embodiments, these are merely certain examples, and the present disclosure is not limited thereto, and should be interpreted as having the broadest scope according to the basic idea disclosed herein. Those skilled in the art will be able to combine and/or substitute the disclosed embodiments to effect a pattern of a shape that has not been stated herein, but this also does not depart from the scope of the present disclosure. Further, it will be apparent to those skilled in the art that various changes, modifications, or combinations can be readily made to the disclosed various embodiments based on the detailed description, and such changes, modifications, or combinations belong to the scope of the present disclosure.

| Description of Reference Numerals | |
| --- | --- |
| 100: conductive adhesive film | 10: adhesive base layer |
| 20: conductive path | 30: particle |
| 40: coating surface | 50: hollow tubular structure |

What is claimed is:

1. A conductive adhesive film comprising:
an adhesive base layer comprising first and second major surfaces facing each other;
a continuous unitary three-dimensional network of hollow tubular metal structures which are electrically and mechanically connected with one another, the hollow tubular metal structures being embedded in the adhesive base layer and being extended between the first and second major surfaces; and
at least one discrete individual particle disposed in each of the hollow tubular metal structures.

2. The conductive adhesive film of claim 1, wherein, with respect to at least two hollow tubular metal structures, one end of one of the hollow tubular metal structures is in contact with or in proximity contact with a center portion of another of the hollow tubular metal structures in an end region, and the at least two hollow tubular metal structures define a hollow opening portion between the at least two hollow tubular metal structures in the end region, and the hollow opening portion is filled with a different binder from a binder of the adhesive base layer at least in part.

* * * * *